(No Model.)
D. A. FLUMMERFELT.
HAND PLANTER.
No. 273,977. Patented Mar. 13, 1883.
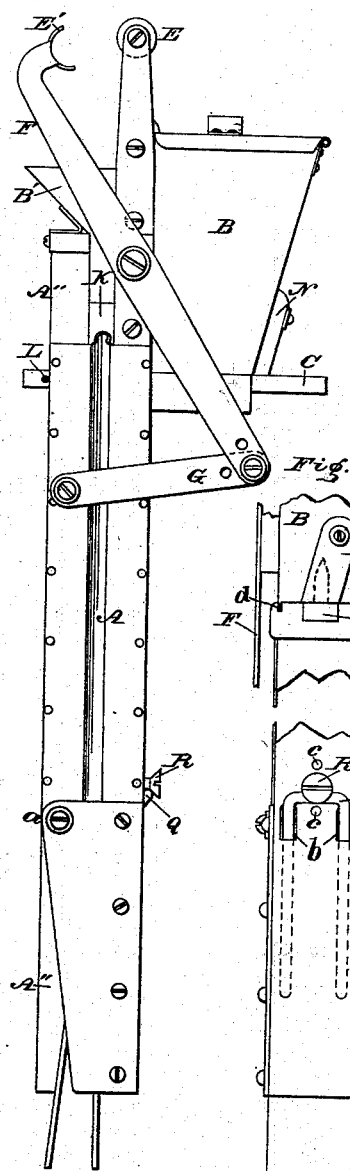
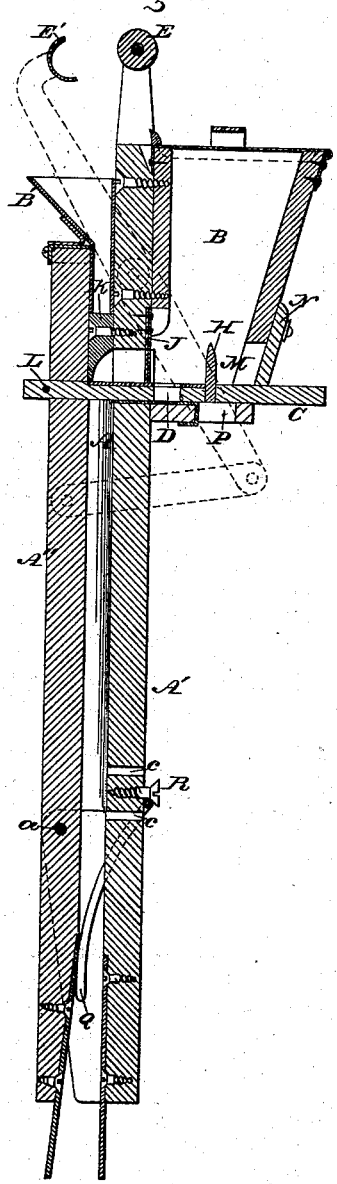
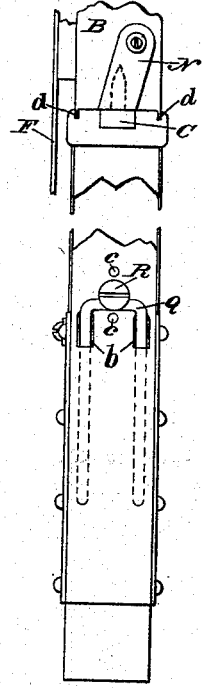
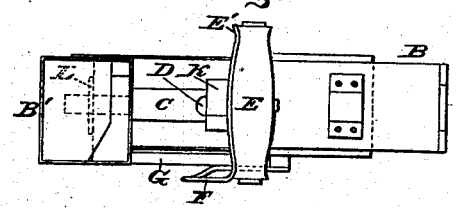
WITNESSES:
L. Douville
H. F. Kircher
INVENTOR:
Daniel A. Flummerfelt,
BY John A. Diedersheim,
ATTORNEY.
N. PETERS, Photo-Lithographer, Washington, D. C.

UNITED STATES PATENT OFFICE.

DANIEL A. FLUMMERFELT, OF DELAWARE STATION, NEW JERSEY.

HAND-PLANTER.

SPECIFICATION forming part of Letters Patent No. 273,977, dated March 13, 1883.

Application filed May 17, 1882. (No model.)

*To all whom it may concern:*

Be it known that I, DANIEL A. FLUMMERFELT, a citizen of the United States, residing at Delaware Station, in the county of Warren, State of New Jersey, have invented a new and useful Improvement in Hand-Planters, which improvement is fully set forth in the following specification and accompanying drawings, in which—

Figure 1 is a side elevation of the hand-planter embodying my invention. Fig. 2 is a longitudinal section thereof. Fig. 3 is a broken front view. Fig. 4 is a top view thereof.

Similar letters of reference indicate corresponding parts in the several figures.

My invention consists of a hand-planter having a handle for carrying the device and a handle for operating the boot, both handles being so disposed that they may be grasped by one hand.

It also consists in providing the planter with an additional hopper, which communicates with the boot of the main hopper.

It also consists of the spring which opens the boot, made adjustable as to tension.

It further consists of certain details, as will be hereinafter set forth.

Referring to the drawings, A represents the boot of the planter, consisting of legs A' A", pivoted together, as at $a$, and having flexible side coverings, thus forming a chute for the passage of the seed which is directed thereto from the hopper B, the latter being secured to the legs A' of the boot.

In the bottom of the hopper B is an opening, which is occupied by a slide, C, which is connected to the other leg, A''', of the boot, whereby by the operation of said leg the slide is moved. In the slide is a discharge-opening, D, which, when the slide is in its normal position, is in communication with the hopper B. Consequently when the slide is drawn out by the leg A" the opening D leaves the base of the hopper and occupies a position over the space between the legs of the boot, so that the seed from the hopper is conveyed to the boot and dropped thereinto.

E represents the handle of the leg A', and E' represents a handle adapted for operating the leg A", said handle E' projecting laterally from an arm or lever, F, so as to be parallel with the handle E, said lever F being pivoted to the leg A' and to an arm, G, which is pivoted to the leg A". It will be seen that the two handles E E' are in such position that when the handle E is grasped the fingers readily reach the handle E', and provision is thereby made for drawing one toward the other, whereby the slide C is moved, the operation requiring but the use of one hand, the other hand being left free for replenishing the hopper or other purposes.

A hopper, B', is connected to the leg A", and has its throat or discharge-spout open into the boot, so that different seed may be planted— as, for example, corn and pumpkin-seed—the main hopper B containing the corn, and the other hopper, B', receiving the pumpkin-seed, which is dropped thereinto as required.

From the slide C rises a stud, H, which serves to agitate the seed in the hopper and prevent clogging thereof, and depending from the wall of the hopper, adjacent to the top of the leg A', above the opening for the slide C, is an elastic finger, J, which serves to clear the slide and prevent crowding or overfilling of the discharge-opening of said slide.

K represents a guard, which is secured to the top of the leg A' outside of the hopper B, so as to overhang the slide C, whereby when the slide filled with seed is drawn out the opening D comes under and is covered by said guard, so that the seed is prevented from flying upwardly, and is thus unfailingly directed into the boot. The slide has a shoulder which rests against the leg A", and the end of the slide opposite to the shoulder has passed through it a pin or key, L, whereby said end is firmly secured to the leg A". The other end of the slide passes freely through the wall of the hopper, at the base thereof, the wall opposite to the boot having an opening, M, over which is a cover, N, pivoted to the hopper, said opening being adapted to permit the passage of the stud H in applying the slide in position or removing it therefrom. When the slide is to be located the cover N is raised and the slide inserted through the hopper and tops of the legs of the boot. The pin L is then passed through the slide and the cover N lowered, whereby the slide may be operated and the opening M is closed.

P represents an opening in the base of the hopper, below the slide C, which permits dirt and sediment to escape and prevents clogging of the slide.

Q represents the spring which opens the boot after the legs have been drawn together and the seed is dropped into the boot, the opening of the boot permitting the discharge of the seed from the boot to the ground, said spring being of somewhat U shape, the limbs passing through slots $b$ in one leg of the boot and bearing against the inner face of the other boot, the crown of the spring being held in position on the outer face of the slotted leg by a screw, R, which is fitted in an opening, $c$, in said leg, there being a series of such openings $c$, so that the screw R may enter either opening, and thus the spring may be shifted or moved in and out, and thus adjusted so as to regulate its tension on the boot, the spring then being retained in its adjusted position by the screw R.

The lever F and arm G may be adjustably connected, so as to regulate the extent of opening of the boot and separation of the handle E' from the handle E.

The upper face of the base of the hopper, at the sides thereof, is grooved at $d$ to receive the lower edges of the side walls of the hopper, thus forming a tight joint for the base of the hopper.

The top of the slide and upper face of the base of the hopper are lined with metal, so as to strengthen said parts where they are exposed to wear.

Having thus described my invention, what I claim as new, and desire to secure by Letters Patent, is—

1. The combination, in a hand-planter, of the boot, each leg whereof is provided with a handle, the two handles being arranged in the same horizontal plane and in proximity to each other, so as to be grasped by one hand, substantially as and for the purpose set forth.

2. The legs $A'$ $A^2$, pivotally connected, as shown, in combination with the handles E E', arranged in the same horizontal plane and so as to be grasped by one hand, the lever F, and arm G, the handle E' extending laterally from lever F, substantially as set forth.

3. The boot, in combination with the adjustable spring Q and the pin or screw R, substantially as and for the purpose set forth.

DANIEL A. FLUMMERFELT.

Witnesses:
JOHN A. WIEDERSHEIM,
A. P. GRANT.